United States Patent
Tian et al.

(10) Patent No.: US 12,540,126 B2
(45) Date of Patent: Feb. 3, 2026

(54) METHOD FOR PREPARING OXETAN-2-YLMETHANAMINE

(71) Applicant: ACCELA CHEMBIO CO., LTD., Shanghai (CN)

(72) Inventors: Yong Tian, Shanghai (CN); Jun Yang, Shanghai (CN); Duoqing Xue, Shanghai (CN); Yong Wu, Shanghai (CN); Lihuang Chen, Shanghai (CN)

(73) Assignee: ACCELA CHEMBIO CO., LTD., Shanghai (CN)

( * ) Notice: Subject to any disclaimer, the term of this patent is extended or adjusted under 35 U.S.C. 154(b) by 10 days.

(21) Appl. No.: 17/639,178

(22) PCT Filed: Nov. 12, 2021

(86) PCT No.: PCT/CN2021/130386
§ 371 (c)(1),
(2) Date: Feb. 28, 2022

(87) PCT Pub. No.: WO2023/065434
PCT Pub. Date: Apr. 27, 2023

(65) Prior Publication Data
US 2024/0317695 A1   Sep. 26, 2024

(30) Foreign Application Priority Data
Oct. 20, 2021 (CN) .......................... 202111219345.2

(51) Int. Cl.
*C07D 305/06* (2006.01)
(52) U.S. Cl.
CPC ................. *C07D 305/06* (2013.01)
(58) Field of Classification Search
CPC .................................................. C07D 305/06
See application file for complete search history.

(56) References Cited

U.S. PATENT DOCUMENTS

2021/0230189 A1   7/2021   Brown et al.

FOREIGN PATENT DOCUMENTS

| CN | 101061110 A | 9/2010 |
| KR | 1020150141275 | 12/2015 |
| WO | 2006040113 A2 | 4/2006 |
| WO | 2006040113 A3 | 4/2006 |

OTHER PUBLICATIONS

Sheehan & Bolhofer, An Improvement Procedure for the Condensation of Potassium Phthalimide with Organic Halides, Journal of the American Chemical Society, Dec. 1, 1950.
Fitton et al., Synthesis of Simple Oxetanes Carrying Reactive 2-Substituents, Synthesis, vol. 12, Dec. 31, 1987, ISSN:0090-6883.

*Primary Examiner* — Golam M Shameem
(74) *Attorney, Agent, or Firm* — Bay State IP, LLC

(57) ABSTRACT

Disclosed is a method for preparing oxetan-2-ylmethanamine, which belongs to the field of organic synthesis. [2-(1-ethoxyethoxy)methyl]propylene oxide is used as an initial raw material, and reacted in the presence of potassium tert-butoxide and trimethylsulfoxonium iodide; the resulting product is reacted with a sulfonyl compound and triethylamine; the resulting product is reacted with a compound of phthalimide; the resulting product is reacted with an amino group-containing compound, to obtain oxetan-2-ylmethanamine. The method according to the disclosure allows for an overall yield of not less than 30% in scale-up production (kilogram level), which is higher. Moreover, compared with the traditional method for preparing oxetan-2-ylmethanamine, a palladium-carbon catalytic hydrogenation step is not required, and dangerous chemical-sodium azide is not required in the method according to the disclosure. Thus, the method has high safety, low production cost, simple operations, and thereby is suitable for industrial production.

20 Claims, No Drawings

METHOD FOR PREPARING OXETAN-2-YLMETHANAMINE

CROSS REFERENCE TO RELATED APPLICATION

This patent application is for entry into the U.S. National Phase from which priority is claimed under all applicable sections of Title 35 of the United States Code including, but not limited to, Sections 120, 363, and 365(c) to International Application No. PCT/CN2021/130386 filed on Nov. 12, 2021, and which in turn claims priority under 35 USC 119 to Chinese Patent Application No. 202111219345.2 filed on Oct. 20, 2021.

TECHNICAL FIELD

The present disclosure relates to the technical field of organic synthesis, in particular to a method for preparing oxetan-2-ylmethanamine.

BACKGROUND ART

Oxetan-2-ylmethanamine is an important intermediate compound in organic synthesis. US2019382384A1 discloses a method for preparing oxetan-2-ylmethanamine, and the reaction route is as follows:

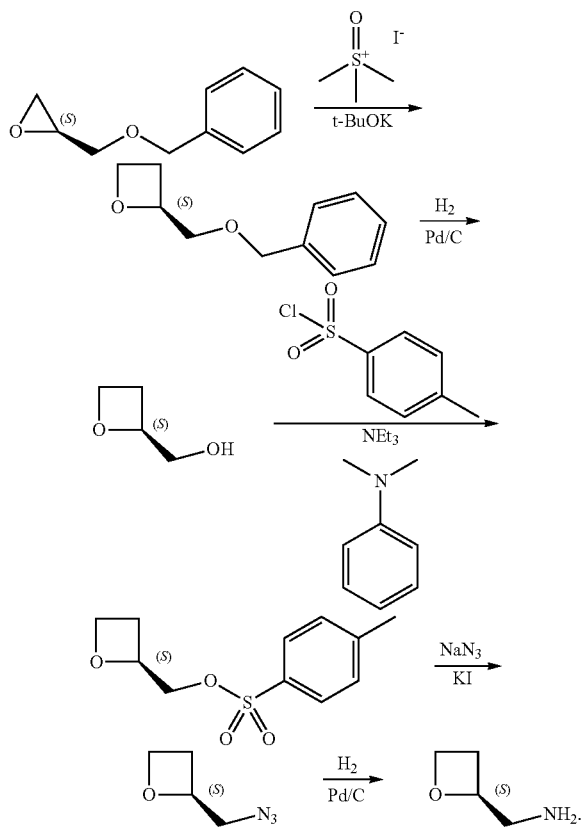

However, the oxetan-2-ylmethanamine was synthesized by the above method in a low overall yield, being only 19.3%.

SUMMARY

An object of the present disclosure is to provide a method for preparing oxetan-2-ylmethanamine, which allows for a higher yield.

To achieve the above-mentioned object, the present disclosure provides the following technical solutions:

Provided is a method for preparing oxetan-2-ylmethanamine, which includes (1) mixing [2-(1-ethoxyethoxy)methyl]propylene oxide with an acid solution, and subjecting the resulting mixture to an acid-catalyzed hydrolysis reaction, to obtain (oxetan-2-yl)methanol, wherein the [2-(1-ethoxyethoxy)methyl]propylene oxide includes at least one selected from the group consisting of (2S)-[2-(1-ethoxyethoxy)methyl]propylene oxide, (2R)-[2-(1-ethoxyethoxy)methyl]propylene oxide, and (2S,2R)-[2-(1-ethoxyethoxy) methyl]propylene oxide;

(2) mixing the (oxetan-2-yl)methanol, a sulfonyl compound, triethylamine, and a chlorinated alkane solvent, and subjecting the resulting mixture to an esterification reaction, to obtain (oxetan-2-yl)methyl p-toluenesulfonate;

(3) mixing the (oxetan-2-yl)methyl p-toluenesulfonate, a compound of phthalimide, and an amide solvent, and subjecting the resulting mixture to a first substitution reaction, to obtain (oxetan-2-yl)methyl-isoindole-1,3-dione; and (4) mixing the (oxetan-2-yl)methyl-isoindole-1,3-dione, an amino group-containing compound, and water, and subjecting the resulting mixture to a second substitution reaction, to obtain the oxetan-2-ylmethanamine.

In some embodiments, in step (1), the acid solution includes at least one selected from the group consisting of an acetic acid solution, a formic acid solution, a propionic acid solution, a butyric acid solution, a hydrochloric acid solution, and a sulfuric acid solution.

In some embodiments, in step (1), a molar ratio of the [2-(1-ethoxyethoxy)methyl]propylene oxide to an acid in the acid solution is in the range of 1:0.8-2.

In some embodiments, in step (1), a mass ratio of the [2-(1-ethoxyethoxy)methyl]propylene oxide to the acid in the acid solution is in the range of 17 kg:3-21 kg.

In some embodiments, in step (1), the acid-catalyzed hydrolysis reaction is performed at a temperature of 20-30° C. for 15-20 h.

In some embodiments, the method further includes a post-treatment after the acid-catalyzed hydrolysis reaction in step (1), wherein the post-treatment includes adjusting a pH value of a reaction liquid obtained from the acid-catalyzed hydrolysis reaction to 11-12, and subjecting the reaction liquid to an extraction to obtain an organic phase, drying the organic phase, and concentrating to a constant weight.

In some embodiments, in step (2), a molar ratio of the (oxetan-2-yl)methanol, the sulfonyl compound, and triethylamine is in the range of 1:1.2-2:1.8-2.5.

In some embodiments, in step (2), the esterification reaction is performed at a temperature of 20-30° C. for 15-20 h.

In some embodiments, the method further includes a post-treatment after the esterification reaction in step (2), wherein the post-treatment includes adding water to a reaction liquid obtained from the esterification reaction, and layering the resulting mixture to obtain an organic phase, and subjecting the organic phase to a washing with a hydrochloric acid solution, a washing with saturated aqueous sodium bicarbonate solution, and a washing with water in sequence; drying a washed organic phase and concentrating to obtain a concentrated product, and subjecting the concentrated product to a recrystallization.

In some embodiments, in step (3), a molar ratio of the (oxetan-2-yl)methyl p-toluenesulfonate to the compound of phthalimide is in the range of 1:1-1.5.

In some embodiments, in step (3), the first substitution reaction is performed at a temperature of 110-120° C. for 3-5 h.

In some embodiments, the method further includes a post-treatment after the first substitution reaction in step (3), wherein the post-treatment includes
cooling a reaction liquid obtained from the first substitution reaction to room temperature, adding water and an organic solvent thereto, layering the resulting mixture, to obtain an aqueous phase and an organic phase; subjecting the aqueous phase to an organic extraction, and washing an organic phase obtained from the organic extraction and the organic phase obtained from the layering with saturated aqueous sodium chloride solution, sequentially drying a washed organic phase, concentrating to obtain a concentrated product; subjecting the concentrated product to a recrystallization.

In some embodiments, in step (4), a molar ratio of the (oxetan-2-yl)methyl-isoindole-1,3-dione to the amino group-containing compound is in the range of 1:1.5-3.

In some embodiments, in step (4), the amino group-containing compound includes at least one selected from the group consisting of hydrazine hydrate, methylamine, and ethylamine.

In some embodiments, in step (4), the second substitution reaction is performed at a temperature of 40-50° C. for 35-40 h.

In some embodiments, the method further includes a post-treatment after the second substitution reaction in step (4), wherein the post-treatment includes
cooling a reaction liquid obtained from the second substitution reaction, and filtrating a cooled reaction liquid to obtain a filtrate; adjusting a pH value of the filtrate to 4-5, and subjecting the filtrate to a pre-extraction; adjusting a pH value of an aqueous phase obtained from the pre-extraction to 13-14, and subjecting the aqueous phase to an extraction to obtain an organic phase; subjecting organic phases obtained from the pre-extraction and the extraction to a drying, a concentrating, and a distilling in sequence.

The present disclosure provides a method for preparing (S)-oxetan-2-ylmethanamine, which includes the following steps: (1) mixing [2-(1-ethoxyethoxy)methyl]propylene oxide with an acid solution, and subjecting the resulting mixture to an acid-catalyzed hydrolysis reaction, to obtain (oxetan-2-yl)methanol, wherein the [2-(1-ethoxyethoxy)methyl]propylene oxide includes at least one selected from the group consisting of (2S)-[2-(1-ethoxyethoxy)methyl] propylene oxide, (2R)-[2-(1-ethoxyethoxy)methyl]propylene oxide, and (2S,2R)-[2-(1-ethoxyethoxy)methyl]propylene oxide; (2) mixing the (oxetan-2-yl)methanol, a sulfonyl compound, triethylamine and a chlorinated alkane solvent, and subjecting the resulting mixture to an esterification reaction, to obtain (oxetan-2-yl)methyl p-toluenesulfonate; (3) mixing the (oxetan-2-yl)methyl p-toluenesulfonate, a compound of phthalimide, and an amide solvent, and subjecting the resulting mixture to a first substitution reaction, to obtain (oxetan-2-yl)methyl-isoindole-1,3-dione; (4) mixing the (oxetan-2-yl)methyl-isoindole-1,3-dione, an amino group-containing compound, and water, and subjecting the resulting mixture to a second substitution reaction, to obtain the oxetan-2-ylmethanamine. As shown by results of examples, the overall yield of (S)-oxetan-2-ylmethanamine in laboratory preparation is 30.22%, and the overall yield in scale-up production is 30.03%; the overall yield of (R)-oxetan-2-ylmethanamine in laboratory preparation is 32.28%; the overall yield of oxetan-2-ylmethanamine in laboratory preparation is 35.53%. It shows that the method according to the present disclosure allows for high yield and good repeatability.

Moreover, in the method according to the present disclosure, a palladium-carbon catalyzed hydrogenation step is not required, and dangerous chemical-sodium azide is not required. Therefore, the method has high safety, low production cost, and simple operations, and thereby is suitable for industrial production.

DETAILED DESCRIPTION OF THE EMBODIMENTS

Technical solutions of the present disclosure will be further described below in conjunction with embodiments and drawings.

Disclosed is a method for preparing oxetan-2-ylmethanamine, which includes the following steps:
(1) mixing [2-(1-ethoxyethoxy)methyl]propylene oxide with an acid solution, and subjecting the resulting mixture to an acid-catalyzed hydrolysis reaction, to obtain (oxetan-2-yl)methanol, wherein the [2-(1-ethoxyethoxy)methyl]propylene oxide includes at least one selected from the group consisting of (2S)-[2-(1-ethoxyethoxy)methyl]propylene oxide, (2R)-[2-(1-ethoxyethoxy)methyl]propylene oxide, and (2S,2R)-[2-(1-ethoxyethoxy) methyl]propylene oxide;
(2) mixing the (oxetan-2-yl)methanol, a sulfonyl compound, triethylamine, and a chlorinated alkane solvent, and subjecting the resulting mixture to an esterification reaction, to obtain (oxetan-2-yl)methyl p-toluenesulfonate;
(3) mixing the (oxetan-2-yl)methyl p-toluenesulfonate, a compound of phthalimide, and an amide solvent, and subjecting the resulting mixture to a first substitution reaction, to obtain (oxetan-2-yl)methyl-isoindole-1,3-dione; and
(4) mixing the (oxetan-2-yl)methyl-isoindole-1,3-dione, an amino group-containing compound, and water, and subjecting the resulting mixture to a second substitution reaction, to obtain the oxetan-2-ylmethanamine.

In the present disclosure, [2-(1-ethoxyethoxy)methyl]propylene oxide is mixed with an acid solution, and the resulting mixture is subjected to an acid-catalyzed hydrolysis reaction, to obtain (oxetan-2-yl)methanol. The [2-(1-ethoxyethoxy)methyl]propylene oxide includes (2S)-[2-(1-ethoxyethoxy)methyl]propylene oxide, (2R)-[2-(1-ethoxyethoxy) methyl]propylene oxide, or (2S,2R)-[2-(1-ethoxyethoxy) methyl]propylene oxide.

In the present disclosure, unless otherwise specified, all raw materials are commercially available products well known to those skilled in the art.

In some embodiments of the present disclosure, the method for preparing the [2-(1-ethoxyethoxy)methyl]propylene oxide includes the following steps:
mixing a glycidol compound, ethyl vinyl ether, and p-toluenesulfonic acid, and subjecting the resulting mixture to an addition reaction, to obtain 2-[(1-ethoxyethoxy) methyl]oxirane, wherein the glycidol compound includes (R)-(+)-glycidol, (S)-glycidol, or glycidol; and mixing potassium tert-butoxide, trimethylsulfoxonium iodide, the 2-[(1-ethoxyethoxy)methyl]oxirane, and an alcohol solvent, and subjecting the resulting mixture to a ring expansion reaction, to obtain the [2-(1-ethoxyethoxy)methyl]propylene oxide.

In the present disclosure, a glycidol compound, ethyl vinyl ether, and p-toluenesulfonic acid are mixed, and the resulting mixture is subjected to an addition reaction, to obtain the 2-[(1-ethoxyethoxy)methyl]oxirane.

In the present disclosure, the glycidol compound includes (R)-(+)-glycidol, (S)-(−)-glycidol, or glycidol. Under the condition that the glycidol compound is (R)-(+)-glycidol, (2S)-2-[(1-ethoxyethoxy)methyl]oxirane is prepared. Under the condition that the glycidol compound is (S)-(−)-glycidol, (2R)-2-[(1-ethoxyethoxy)methyl]oxirane is prepared. Under the condition that the glycidol compound is glycidol, (2S, 2R)-[2-(1-ethoxyethoxy)methyl]propylene oxide is prepared. In some embodiments of the present disclosure, p-toluenesulfonic acid is used in the form of p-toluenesulfonic acid hydrate. In some embodiments of the present disclosure, a molar ratio of the glycidol compound, ethyl vinyl ether, and p-toluenesulfonic acid is in the range of 1:2-5:0.01-0.02, preferably 1:2.5-4.5:0.012-0.018, and further preferably 1:3-4:0.015-0.016. In some embodiments of the present disclosure, a mass ratio of the glycidol compound, ethyl vinyl ether, and p-toluenesulfonic acid is in the range of 10 kg:19.5-48.75 kg:232-660 g, preferably 10 kg:20-40 kg:300-500 g. In the present disclosure, there is no particular limitation on a means for mixing, and a means for mixing well known to those skilled in the art may be used. In some embodiments, a sequence for the mixing is limited as follows: the glycidol compound and ethyl vinyl ether are pre-mixed and the resulting mixture is cooled to a temperature of 0-10° C.; p-toluenesulfonic acid is then added thereto and they are mixed. In the present disclosure, there is no particular limitation on a means for cooling, and a means for cooling well known to those skilled in the art may be used. In some embodiments, p-toluenesulfonic acid is added in 3-10 times, and preferably 5-8 times.

In some embodiments of the present disclosure, the addition reaction is performed at a temperature of 20-30° C., preferably 22-28° C., and more preferably 25-26° C. In some embodiments, the addition reaction is performed for 3-5 h, preferably 3.5-4.5 hours, and more preferably 4 hours. In some embodiments of the present disclosure, the addition reaction is conducted according to Formula (1-1), Formula (1-2) or Formula (1-3):

Formula (1-1)

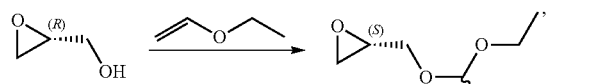

Formula (1-2)

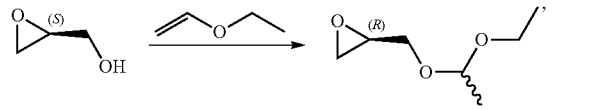

Formula (1-3)

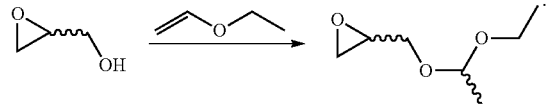

In some embodiments of the present disclosure, the method further includes a post-treatment after the addition reaction, to obtain 2-[(1-ethoxyethoxy)methyl]oxirane. In some embodiments of the present disclosure, the post-treatment includes washing the reaction liquid obtained from the addition reaction with saturated aqueous sodium bicarbonate solution and standing for layering, to obtain an aqueous phase and an organic phase; subjecting the aqueous phase to an extraction, combining organic phases obtained, drying, and concentrating. In some embodiments of the present disclosure, the washing with the saturated aqueous sodium bicarbonate solution is performed under a stirring condition. In some embodiments, the stirring is performed at room temperature. In some embodiments, the stirring is performed for 1-2 hours, and preferably 1.5 hours. In some embodiments, a mass ratio of the glycidol compound to the saturated aqueous sodium bicarbonate solution is in the range of 1:1.5-5.0, and preferably 1:2.7. In some embodiments of the present disclosure, an extractant for the extraction is at least one of methyl tert-butyl ether, isopropyl ether, and ethyl acetate. In some embodiments of the present disclosure, the drying is performed with a desiccant. In some embodiments, the desiccant includes anhydrous sodium sulfate. In some embodiments, the method further includes filtrating after drying with a desiccant, to remove the desiccant. In some embodiments, a mass ratio of the glycidol compound to the desiccant is in the range of 1:0.1-0.5, and preferably 1:0.2-0.3. In the present disclosure, there is no special limitation on a means for concentrating, and a means for concentrating well known to those skilled in the art may be used as long as a constant weight could be reached by concentrating.

In the present disclosure, after obtaining 2-[(1-ethoxyethoxy)methyl]oxirane, potassium tert-butoxide, trimethylsulfoxonium iodide, 2-[(1-ethoxyethoxy)methyl]oxirane are mixed with the alcohol solvent, and the resulting mixture is subjected to a ring expansion reaction, to obtain [2-(1-ethoxyethoxy)methyl]propylene oxide.

In some embodiments of the present disclosure, a molar ratio of 2-[(1-ethoxyethoxy)methyl]oxirane, potassium tert-butoxide and trimethylsulfoxonium iodide is in the range of 1:2-3:2-3, preferably 1:2.2-2.8:2.2-2.8, and more preferably 1:2.4-2.5:2.4-2.5. In some embodiments of the present disclosure, a mass ratio of 2-[(1-ethoxyethoxy)methyl]oxirane, potassium tert-butoxide, and trimethylsulfoxonium iodide is in the range of 18 kg:27.6-41.4 kg:54.2-81.3 kg, and preferably 18 kg:30-40 kg:60-70 kg. In some embodiments of the present disclosure, the alcohol solvent includes at least one of tert-butanol, methanol, ethanol, isopropanol, and n-butanol. In some embodiments, a ratio of the mass of 2-[(1-ethoxyethoxy)methyl]oxirane to the volume of the alcohol solvent is in the range of 1 kg:10-30 L, and preferably 1 kg:20 L. In some embodiments of the present disclosure, potassium tert-butoxide, trimethylsulfoxonium iodide, 2-[(1-ethoxyethoxy)methyl]oxirane and the alcohol solvent are mixed at a temperature of 60-70° C., and preferably 65° C. In some embodiments, a sequence for mixing is as follows: potassium tert-butoxide, trimethylsulfoxonium iodide and part of the alcohol solvent are pre-mixed, to obtain a premixed liquid; 2-[(1-ethoxyethoxy)methyl]oxirane is mixed with the remaining alcohol solvent, to obtain a 2-[(1-ethoxyethoxy)methyl]oxirane solution; the 2-[(1-ethoxyethoxy)methyl]oxirane solution was added dropwise to the premixed liquid. In some embodiments of the present disclosure, the volume of the part of the alcohol solvent is 2-10% of the total volume of the alcohol solvent, and preferably 5%. In some embodiments of the present disclosure, the pre-mixing is performed for 1-2 hours, and preferably 1.5 hours. In the present disclosure, there is no special limitation on the dropping speed, as long as it could be added drop by drop.

In some embodiments of the present disclosure, the ring expansion reaction is performed at a temperature of 60-70° C., preferably 62-68° C., and more preferably 64-65° C. In some embodiments, a timing starts after adding the 2-[(1-ethoxyethoxy)methyl]oxirane solution dropwise, and the ring expansion reaction is performed for 15-20 h, preferably 16-19 h, and more preferably 17-18 h. In the present disclosure, the ring expansion reaction is conducted according to Formula (2-1), Formula (2-2) or Formula (2-3):

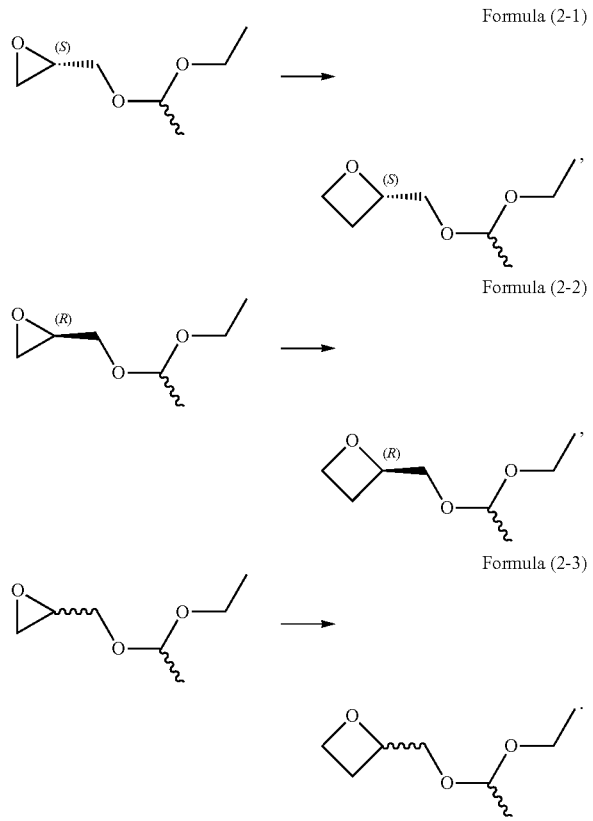

In some embodiment, the method further includes a post-treatment after the ring expansion reaction, to obtain [2-(1-ethoxyethoxy)methyl]propylene oxide. In some embodiment of the present disclosure, the post-treatment includes subjecting the reaction liquid obtained from the ring expansion reaction to a solid-liquid separation to obtain a liquid, concentrating the liquid, diluting, subjecting a diluted mixture to an extraction to obtain an organic phase, and subjecting the organic phase to a washing with saturated aqueous sodium chloride solution, a drying, and a concentrating to a constant weight in sequence. In the present disclosure, there is no particular limitation on a means for the solid-liquid separation, and a means for the solid-liquid separation well known to those skilled in the art may be used, such as filtrating. In the present disclosure, there is no special limitation on a means for concentrating the liquid component. In some embodiments, a ratio of the mass of the 2-[(1-ethoxyethoxy)methyl]oxirane to the volume of the concentrated liquid obtained by concentrating is in the range of 1 kg:1.0-2.0 L, and preferably 1 kg:1.1-1.2 L. In some embodiments of the present disclosure, a diluent for diluting is water. In some embodiments, a ratio of the mass of 2-[(1-ethoxyethoxy)methyl]oxirane to the volume of water for diluting is in the range of 1 kg:2-5 L, and preferably 1 kg:2.5 L. In some embodiments of the present disclosure, an extractant for the extraction is at least one of methyl tert-butyl ether, isopropyl ether, and ethyl acetate. In some embodiment, a ratio of the mass of 2-[(1-ethoxyethoxy) methyl]oxirane to the volume of the extractant is in the range of 1 kg:1.5-5.0 L, and preferably 1 kg:2 L. In some embodiments of the present disclosure, a ratio of the mass of 2-[(1-ethoxyethoxy)methyl]oxirane to the volume of the saturated aqueous sodium chloride solution is in the range of 1 kg:1.0-5.0 L, and preferably 1 kg:1.5 L. In some embodiments of the present disclosure, a means for drying is a drying with a desiccant. In some embodiments, the desiccant includes anhydrous sodium sulfate. In some embodiments, the method further includes filtrating after the drying with a desiccant, to remove the desiccant. In some embodiments, a mass ratio of 2-[(1-ethoxyethoxy)methyl]oxirane to the desiccant is in the range of 1:0.1-0.5, and preferably 1:0.2. In the present disclosure, there is no particular limitation on a means for concentrating, and a means for concentrating well known to those skilled in the art may be used.

In the present disclosure, after obtaining [2-(1-ethoxyethoxy)methyl]propylene oxide, the [2-(1-ethoxyethoxy) methyl]propylene oxide is mixed with an acid solution, and the resulting mixture is subjected to an acid-catalyzed hydrolysis reaction, to obtain (oxetan-2-yl)methanol.

In some embodiments of the present disclosure, the acid solution includes at least one of an acetic acid solution, a formic acid solution, a propionic acid solution, a butyric acid solution, a hydrochloric acid solution, and a sulfuric acid solution. In some embodiments, the acid solution has a concentration of 1.5-3.0 mol/L, and preferably 1.9-2 mol/L. In some embodiments, the acid solution is obtained by dissolving an acid in water. In some embodiments of the present disclosure, a molar ratio of [2-(1-ethoxyethoxy) methyl]propylene oxide to an acid in the acid solution is in the range of 1:0.8-2, and preferably 1:1-1.5. In the present disclosure, there is no particular limitation on a means for mixing, as long as raw materials could be mixed to be uniform. In some embodiments of the present disclosure, a mass ratio of [2-(1-ethoxyethoxy)methyl]propylene oxide to the acid in the acid solution is in the range of 17 kg:3-21 kg, and preferably 17 kg:5-15 kg.

In some embodiments of the present disclosure, the acid-catalyzed hydrolysis reaction is performed at a temperature of 20-30° C., preferably 22-28° C., and more preferably 25-26° C. In some embodiments, the acid-catalyzed hydrolysis reaction is performed for 15-20 h, preferably 16-19 h, and more preferably 17-18 h. In the present disclosure, the acid-catalyzed hydrolysis reaction is conducted according to Formula (3-1), Formula (3-2) or Formula (3-3):

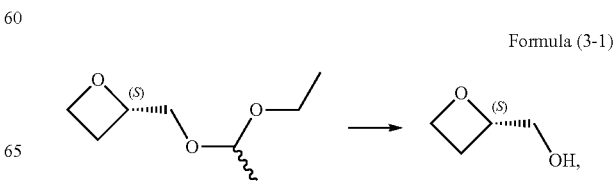

-continued

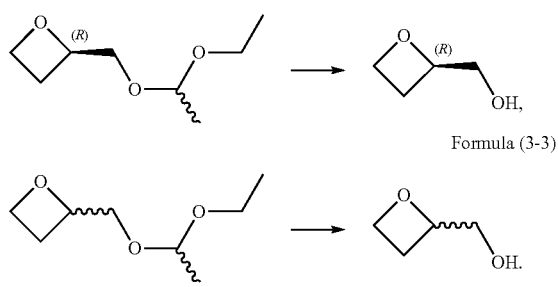

Formula (3-2)

Formula (3-3)

In some embodiments of the present disclosure, the method further includes a post-treatment after the acid-catalyzed hydrolysis reaction, to obtain (oxetanyl-2-yl) methanol. In some embodiments of the present disclosure, the post-treatment includes adjusting a pH value of the reaction liquid obtained from the acid-catalyzed hydrolysis reaction to 11-12, subjecting the resulting liquid to an extraction to obtain an organic phase, drying the organic phase and concentrating to a constant weight. In some embodiments of the present disclosure, adjusting to a pH value of 11-12 includes first adjusting to a pH value of 6-7 by using a bicarbonate, and then adjusting to a pH value of 11-12 by using a carbonate. In some embodiments, the bicarbonate includes sodium bicarbonate, potassium hydrogen carbonate. In some embodiments, the bicarbonate is added in 3-10 times. In some embodiments, the carbonate includes potassium carbonate, sodium carbonate. Through the above-described means, the pH value could be adjusted to a required level, meanwhile it is ensured that sufficient salts are dissolved in the aqueous solution to reduce the difficulty of extraction. In some embodiments of the present disclosure, an extractant for the extraction includes at least one of dichloromethane, ethyl acetate, and methyl tert-butyl ether. In the present disclosure, there is no special limitation on the amount of the extractant, the amount of the extractant well known to those skilled in the art may be used. In some embodiments of the present disclosure, the drying is performed with a desiccant. In some embodiments, the desiccant includes anhydrous sodium sulfate. In some embodiments, the method further includes filtering after the drying with a desiccant, to remove the desiccant. In some embodiments, a mass ratio of [2-(1-ethoxyethoxy)methyl]propylene oxide to the desiccant is in the range of 1:0.1-0.5, and preferably 1:0.2. In the present disclosure, there is no particular limitation on a means for concentrating the filtrate, and a means for concentrating well known to the skilled person may be used, as long as a constant weight could be reached.

In the present disclosure, after obtaining (oxetan-2-yl) methanol, the (oxetan-2-yl)methanol, the sulfonyl compound, triethylamine, and the chlorinated alkane solvent are mixed, and the resulting mixture is subjected to an esterification reaction, to obtain (oxetanyl-2-yl)methyl p-toluenesulfonate.

In some embodiments of the present disclosure, the sulfonyl compound includes at least one of p-toluenesulfonyl chloride, methylsulfonyl chloride, ethylsulfonyl chloride, benzenesulfonyl chloride, and 4-nitrobenzenesulfonyl chloride. In some embodiments of the present disclosure, a molar ratio of (oxetan-2-yl)methanol, the sulfonyl compound, and triethylamine is in the range of 1:1.2-2:1.8-2.5, and preferably 1:1.5-1.8:2-2.2. In some embodiments of the present disclosure, a mass ratio of (oxetan-2-yl)methanol, the sulfonyl compound, and triethylamine is in the range of 8 kg:12-40 kg, and preferably 8 kg:20-30 kg. In some embodiments of the present disclosure, the chlorinated alkane solvent includes at least one of dichloromethane and chloroform. In some embodiments, a ratio of the mass of (oxetan-2-yl)methanol to the volume of the chlorinated alkane solvent is in the range of 1 kg:5-10 L, and preferably 1 kg:10 L. In the present disclosure, there is no particular limitation on a means for mixing, as long as raw materials could be mixed to be uniform.

In some embodiments of the present disclosure, the esterification reaction is performed at a temperature of 20-30° C., preferably 22-28° C., and more preferably 25-26° C. In some embodiments, the esterification reaction is performed for 15-20 h, preferably 16-19 hours, and more preferably 17-18 hours. In the present disclosure, the esterification reaction is conducted according to Formula (4-1), Formula (4-2) or Formula (4-3)

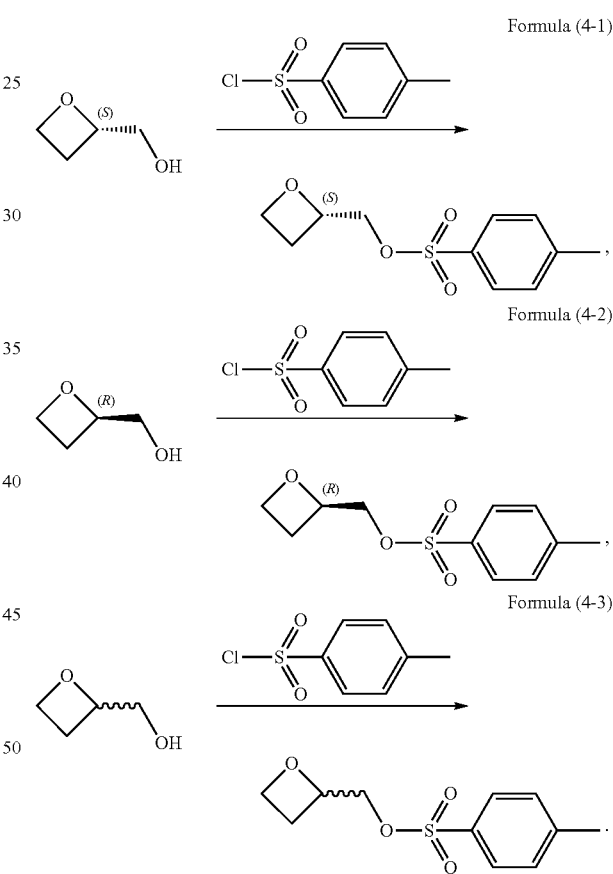

Formula (4-1)

Formula (4-2)

Formula (4-3)

In some embodiments of the present disclosure, the method further includes a post-treatment after the esterification reaction, to obtain (oxetan-2-yl)methyl p-toluenesulfonate. In some embodiments of the present disclosure, the post-treatment includes: adding water to the reaction liquid obtained from the esterification reaction and layering, to obtain an organic phase; subjecting the organic phase to a washing with a hydrochloric acid solution, a washing with saturated aqueous sodium bicarbonate solution, and a washing with water in sequence; subjecting a washed organic phase to a drying, a concentrating, and a recrystallization. In some embodiments of the present disclosure, a mass ratio of (oxetan-2-yl)methanol to water added for layering is in the range of 1:4-10, preferably 1:5. In some embodiments, layering is performed by stirring and then leaving the resulting mixture to stand. In some embodiments, the stirring is performed at room temperature. In some embodiments, the stirring is performed for 15-60 min, and preferably 30 min. In the present disclosure, there is no special limitation on time for standing, as long as the aqueous phase and the organic phase could be separated from each other. In some embodiments of the present disclosure, the hydrochloric acid solution has a concentration of 0.5-1.5 mol/L, and preferably 1 mol/L. In some embodiments, a ratio of the mass of (oxetan-2-yl)methanol to the volume of the hydrochloric acid solution is in the range of 1 kg 3-8 L, and preferably 1 kg 5 L. In some embodiments of the present disclosure, a ratio of the mass of (oxetan-2-yl)methanol to the volume of the saturated aqueous sodium bicarbonate solution is in the range of 1 kg 3-8 L, and preferably 1 kg 5 L. In some embodiments of the present disclosure, a ratio of the mass of (oxetan-2-yl)methanol to the volume of water for washing is in the range of 1 kg 3-8 L, and preferably 1 kg 5 L. In some embodiments of the present disclosure, the drying is performed with a desiccant. In some embodiments, the desiccant includes anhydrous sodium sulfate. In some embodiments, the method further includes filtering after drying with a desiccant, to remove the desiccant. In some embodiments, a mass ratio of (oxetan-2-yl)methanol to the desiccant is in the range of 1:0.2-0.8, and preferably 1:0.4. In the present disclosure, there is no special limitation on a means for concentrating the filtrate, and a means for concentrating the filtrate well known to those skilled in the art may be used. In some embodiments, a ratio of the mass of (oxetan-2-yl)methanol to the volume of the concentrated liquid is in the range of 1 kg 1.0-2.0 L, and preferably 1 kg 1.2-1.3 L. In some embodiments of the present disclosure, the organic solvent for recrystallizing includes methyl tert-butyl ether. In some embodiments, a ratio of the mass of the (oxetan-2-yl)methanol to the volume of the organic solvent for recrystallizing is in the range of 1 kg 2.0-5.0 L, and preferably 1 kg 3 L.

In the present disclosure, after obtaining (oxetan-2-yl)methyl p-toluenesulfonate, the (oxetan-2-yl)methyl p-toluenesulfonate, a compound of phthalimide, and an amide solvent are mixed, and the resulting mixture is subjected to a first substitution reaction, to obtain (oxetan-2-yl)methyl-isoindole-1,3-dione.

In some embodiments of the present disclosure, the compound of phthalimide includes one or more of phthalimide and/or a salt of phthalimide. In some embodiments, the salt of phthalimide includes potassium phthalimide and/or sodium phthalimide. In some embodiments of the present disclosure, a molar ratio of (oxetan-2-yl)methyl p-toluenesulfonate to the compound of phthalimide is in the range of 1:1-1.5, preferably 1:1.1-1.4, and more preferably 1:1.2-1.3. In some embodiments of the present disclosure, a mass of (oxetanyl-2-yl)methyl p-toluenesulfonate to the compound of phthalimide is in the range of 18 kg:11-20.7 kg, and preferably 18 kg:12-15 kg. In some embodiments of the present disclosure, the amide solvent includes N,N-dimethylformamide and/or N,N-dimethylacetamide. In some embodiments, a ratio of the mass of (oxetan-2-yl)methyl p-toluenesulfonate to the volume of the amide solvent is in the range of 1 kg:5-10 L, and preferably 1 kg:7 L. In the present disclosure, there is not particular limitation on a means for mixing, as long as raw materials could be mixed to be uniform.

In some embodiments of the present disclosure, the first substitution reaction is performed at a temperature of 110-120° C., preferably 112-118° C., and more preferably 115-116° C. In some embodiments, the first substitution reaction is performed for 3-5 h, preferably 3.5-4.5 h, and more preferably 4 h. In the present disclosure, the first substitution reaction is conducted according to Formula (5-1), Formula (5-2) or Formula (5-3):

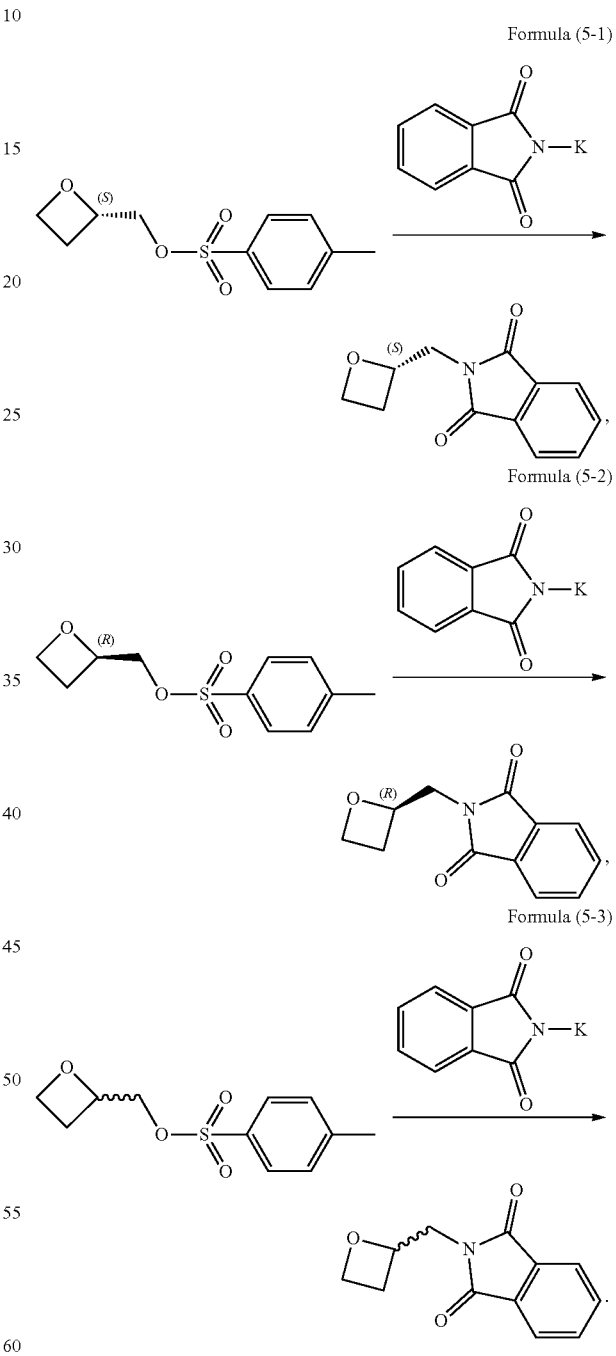

Formula (5-1)

Formula (5-2)

Formula (5-3)

In some embodiments of the present disclosure, the method further includes a post-treatment after the first substitution reaction, to obtain (oxetan-2-yl)methyl-isoindole-1,3-dione. In some embodiments of the present disclosure, the post-treatment includes: cooling the reaction liquid obtained from the first substitution reaction to room temperature, adding water and an organic solvent thereto, and layering, to obtain an aqueous phase and an organic phase; subjecting the aqueous phase to an organic extraction, subjecting an organic phase obtained from the organic extraction and the organic phase obtained from layering to a washing with saturated aqueous sodium chloride solution, a drying, a concentrating and a recrystallizing in sequence. In the present disclosure, there is no special limitation on a means for cooling, and a means for cooling well known to those skilled in the art may be used. In some embodiments of the present disclosure, a ratio of the mass of (oxetan-2-yl)methyl p-toluenesulfonate to the volume of water for layering is in the range of 1 kg: 5-10 L, and preferably 1 kg: 7 L. In some embodiments, the organic solvent for layering includes at least one of ethyl acetate, methyl tert-butyl ether, and dichloromethane. In some embodiments, a ratio of the mass of (oxetan-2-yl)methyl p-toluenesulfonate to the volume of the organic solvent for layering is in the range of 1 kg: 3-8 L, and preferably 1 kg: 5 L. In some embodiments, the layering is performed by stirring and then leaving to stand. In some embodiments, the stirring is performed at room temperature. In some embodiments, the stirring is performed for 15-60 min, and preferably 30 min. In the present disclosure, there is no special limitation on time for standing, as long as the aqueous phase and the organic phase could be separated from each other. In some embodiments of the present disclosure, the extractant for the extraction includes at least one of ethyl acetate, isopropyl acetate, and methyl tert-butyl ether. In some embodiments, the extractions is performed for 2-3 times. In some embodiments, a ratio of the mass of (oxetan-2-yl)methyl p-toluenesulfonate to the volume of the extractant for a single extraction is in the range of 1 kg 2.0-5.0 L, and preferably 1 kg 2.5 L. In some embodiments of the present disclosure, a ratio of the mass of (oxetan-2-yl)methyl p-toluenesulfonate to the volume of the saturated aqueous sodium chloride solution is in the range of 1 kg 3-8 L, and preferably 1 kg 5 L. In some embodiments of the present disclosure, the drying is performed with a desiccant. In some embodiments, the desiccant includes anhydrous sodium sulfate. In some embodiments, the method further includes filtering after drying with a desiccant, to remove the desiccant. In some embodiments, a mass ratio of (oxetan-2-yl)methyl p-toluenesulfonate to the desiccant is in the range of 1:0.1-0.5, and preferably 1:0.2. In the present disclosure, there is no particular limitation on a means for concentrating the filtrate, a means for concentrating well known to those skilled in the art may be used. In some embodiments, a ratio of the mass of (oxetan-2-yl)methyl p-toluenesulfonate to the volume of the concentrated liquid is in the range of 1 kg 1.0-2.0 L, and preferably 1 kg 1.2-1.3 L. In some embodiments of the present disclosure, the organic solvent for recrystallizing includes petroleum ether and n-heptane. In some embodiments, a ratio of the mass of (oxetan-2-yl)methyl p-toluenesulfonate to the volume of the organic solvent for recrystallizing is in the range of 1 kg 4-8 L, and preferably 1 kg 5 L. In some embodiments, the organic solvent for recrystallizing is added dropwise. In the present disclosure, there is no special limitation on the dropping speed, as long as it could be added drop by drop.

In the present disclosure, after obtaining (oxetan-2-yl)methyl-isoindole-1,3-dione, the (oxetan-2-yl)methyl-isoindole-1,3-dione, an amino group-containing compound, and water are mixed, and the resulting mixture is subjected to a second substitution reaction, to obtain oxetan-2-ylmethanamine.

In some embodiments of the present disclosure, the amino group-containing compound includes at least one of hydrazine hydrate, methylamine, and ethylamine. In some embodiments, the amino group-containing compound is used in the form of an amino group-containing compound solution. In some embodiments, the amino group-containing compound solution has a concentration of 30-100 wt %, and preferably 50-80 wt %. In some embodiments, a solvent in the amino group-containing compound solution includes water and/or an alcohol solvent. In some embodiments, the alcohol solvent includes methanol and/or ethanol. In some embodiments of the present disclosure, a molar ratio of (oxetan-2-yl)methyl-isoindole-1,3-dione to the amino group-containing compound is in the range of 1:1.5-3, and preferably 1:2-2.5. In some embodiments of the present disclosure, a mass ratio of (oxetan-2-yl)methyl-isoindole-1,3-dione to the amino group-containing compound is in the range of 10 kg:1.5-12 kg, and preferably 10 kg:3-10 kg. In some embodiments of the present disclosure, a mass ratio of (oxetan-2-yl)methyl-isoindole-1,3-dione to water is in the range of 1:3-8, and preferably 1:5. In the present disclosure, there is no particular limitation on a means for mixing, as long as raw materials could be mixed to be uniform. In some embodiments, a sequence for mixing is as follows: (oxetan-2-yl)methyl-isoindole-1,3-dione and water are mixed, and an amino group-containing compound is added thereto. In some embodiments, the amino group-containing compound is added dropwise. In the present disclosure, there is no special limitation on the dropping speed, as long as it could be added drop by drop.

In some embodiments of the present disclosure, the second substitution reaction is performed at a temperature of 40-50° C., preferably 42-48° C., and more preferably 45-46° C. In some embodiments, the second substitution reaction is performed for 35-40 h, preferably 36-39 hours, and more preferably 37-38 hours. In some embodiments of the present disclosure, the second substitution reaction is conducted according to Formula (6-1), Formula (6-2), or Formula (6-3)

Formula (6-1)

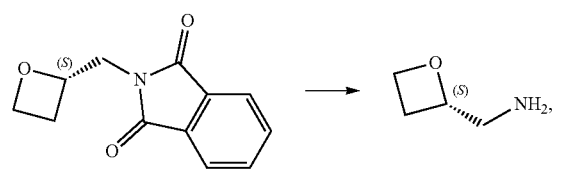

Formula (6-2)

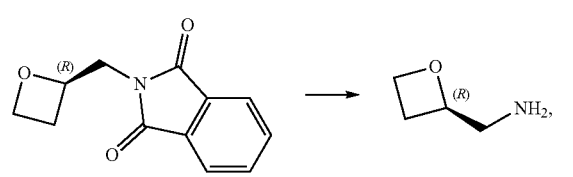

Formula (6-3)

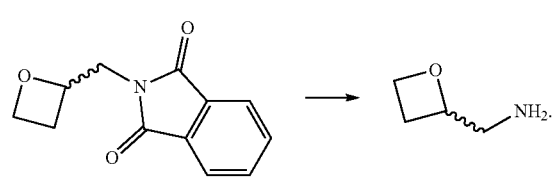

In some embodiments of the present disclosure, the method further includes a post-treatment after the second substitution reaction, to obtain (S)-oxetan-2-ylmethanamine. In some embodiments of the present disclosure, the post-treatment includes cooling the reaction liquid obtained from the second substitution reaction and filtering to obtain a filtrate, adjusting a pH value of the filtrate to 4-5, and subjecting the filtrate to a pre-extraction to obtain an aqueous phase; further adjusting a pH value of the aqueous phase to 13-14 and subjecting the adjusted aqueous phase to an extraction; drying organic phases obtained from the pre-extraction and the extraction, and concentrating and distilling in sequence. In the present disclosure, there is no particular limitation on a means for cooling, as long as the reaction liquid could be cooled to 0-10° C. In some embodiments of the present disclosure, the acid solution for adjusting the pH value to 4-5 includes a hydrochloric acid solution and/or a sulfuric acid solution. In some embodiments, the acid solution has a concentration of 3-5 mol/L, and preferably 4 mol/L. In some embodiments of the present disclosure, an extractant for the pre-extraction and extraction is independently includes dichloromethane and/or chloroform. In some embodiments, a ratio of the mass of (oxetan-2-yl)methyl-isoindole-1,3-dione to the volume of the extractant for pre-extraction is in the range of 1 kg 1.5-3.0 L, and preferably 1 kg 2 L. In some embodiments of the present disclosure, an alkali solution for adjusting the pH value to 13-14 includes sodium hydroxide and/or potassium hydroxide. In some embodiments, the alkali solution has a concentration of 3-5 mol/L, and preferably 4 mol/L. In some embodiments of the present disclosure, the extraction is performed for 5-7 times, and preferably 6 times. In some embodiments, a ratio of the mass of (oxetan-2-yl)methyl-isoindole-1,3-dione to the volume of the extractant for a single extraction is in the range of 1 kg 1.5-3.0 L, and preferably 1 kg 2-2.5 L. In some embodiments of the present disclosure, the drying is performed by drying with a desiccant. In some embodiments, the desiccant includes anhydrous sodium sulfate. In some embodiments, the method further includes filtering after drying with a desiccant to remove the desiccant. In some embodiments, a mass ratio of (oxetan-2-yl)methyl-isoindole-1,3-dione to the desiccant is in the range of 1:0.1-0.5, and preferably 1:0.2-0.3. In the present disclosure, there is no particular limitation to a means for concentrating the filtrate, a means for concentrating well known to those skilled in the art may be used. In some embodiments, a ratio of the mass of (oxetan-2-yl)methyl-isoindole-1,3-dione to the volume of the concentrated liquid is in the range of 1 kg 1-4 L, and preferably 1 kg 2-3 L. In some embodiments of the present disclosure, the distillation is performed at a temperature of 20-60° C., and preferably 30-50° C. In some embodiments, the distillation is performed for 10-30 h, and preferably 15-20 h.

The technical solutions of the present disclosure will be clearly and completely described below in conjunction with the examples of the present disclosure. Obviously, the described examples are only a part of the examples of the present disclosure, rather than all the examples. Based on the examples of the present disclosure, all other examples obtained by those of ordinary skill in the art without creative larbor shall fall within the scope of the present disclosure.

Example 1

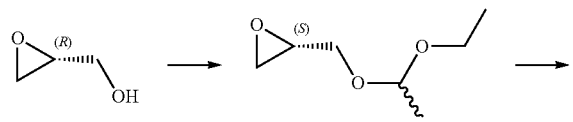

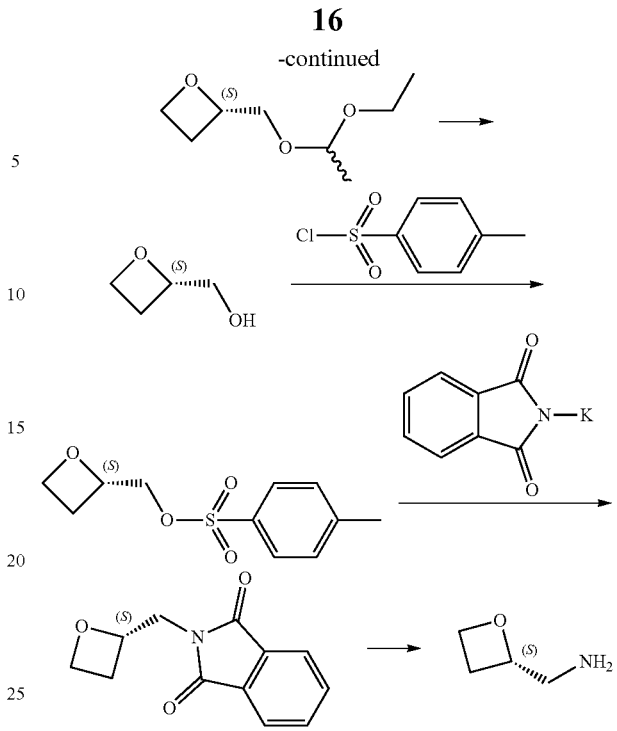

Preparation in Laboratory (1) 100.0 g (1.35 mol, 1.00 equ.) of (R)-(+)-glycidol and 194.7 g (2.70 mol, 2.00 equ.) of ethyl vinyl ether were added into a reaction flask, and cooled to 5° C. 2.6 g (0.01 mol, 0.01 equ.) of p-toluenesulfonic acid hydrate was added thereto in 3 times. The resulting mixture was subjected to an addition reaction at 25° C. for 4 h. 270.0 g of saturated aqueous sodium bicarbonate solution was added thereto. The resulting mixture was stirred for 1 h, left to stand, and layered. The obtained organic phase was dried with 20.0 g of anhydrous sodium sulfate and then filtered. The obtained filtrate was concentrated to a constant weight, obtaining (2S)-2-[(1-ethoxyethoxy)methyl]oxirane (179.0 g, yield 90%).

Nuclear magnetic data of (2S)-2-[(1-ethoxyethoxy)methyl]oxirane is as follows:

$^1$H NMR (300 MHz, CDCl$_3$): δ 4.70 (1H, m), δ 3.60 (2H, m), δ 3.40 (2H, m), δ 3.08 (1H, m), δ 2.74 (1H, t, J=4.8 Hz), δ 2.56 (1H, dd, J=2.4, 5.1 Hz), δ 1.26 (3H, d, J=2.4, 5.1 Hz), 1.15 (3H, t, J=7.2 Hz).

(2) 100.0 g (0.68 mol, 1.00 equ.) of (2S)-2-[(1-ethoxyethoxy)methyl]oxirane was dissolved in 100.0 mL of tert-butanol, obtaining a (2S)-2-[(1-ethoxyethoxy)methyl]oxirane solution. 1900.0 mL of tert-butanol, 153.5 g (1.37 mol, 2.00 equ.) of potassium tert-butoxide, and 301.5 g (1.37 mol, 2.00 equ) of trimethylsulfoxonium iodide were added to a reaction flask, and they were heated to 65° C. and stirred for 1 h. The (2S)-2-[(1-ethoxyethoxy)methyl]oxirane solution was added thereto dropwise at 65° C., and the resulting mixture was subjected to a ring expansion reaction at 65° C. for 15 h. The reaction liquid was filtered, and the obtained filtrate was concentrated to 100 mL. 250.0 mL of water was added thereto, and the resulting mixture was subjected to an extraction with 200.0 mL of methyl tert-butyl ether. The obtained organic phase was washed with 150.0 mL of saturated aqueous sodium chloride solution, then dried with 20.0 g of anhydrous sodium sulfate, and filtered. The obtained filtrate was concentrated to a constant weight, obtaining (2S)-[2-(1-ethoxyethoxy)methyl]propylene oxide (102.6 g, yield 94%).

Nuclear magnetic data of (2S)-[2-(1-ethoxyethoxy)methyl]propylene oxide is as follows:

$^1$H NMR (300 MHz, CDCl$_3$): δ 5.00 (1H, m), δ 4.86 (1H, m), δ 4.72 (1H, m), δ 4.62 (1H, m), δ 3.74 (3H, m), δ 3.56 (1H, m), δ 1.40 (3H, m), δ 1.26 (1H, t, J=7.2 Hz).

(3) 270.0 mL of water, 31.1 g (0.52 mol, 0.83 equ.) of acetic acid, and 100.0 g (0.62 mol, 1.00 equ.) of (2S)-[2-(1-ethoxyethoxy)methyl]propylene oxide were added to a reaction flask, and the resulting mixture was subjected to an acid-catalyzed hydrolysis reaction at 25° C. for 15 h. 45.0 g of sodium bicarbonate was added thereto in 3 times to adjust the pH value to 7, and 150.0 g of potassium carbonate was then added thereto to adjust the pH value to 12. The resulting mixture was subjected to an extraction with dichloromethane. The obtained organic phase was dried with 20.0 g of anhydrous sodium sulfate and then filtered. The obtained filtrate was concentrated to a constant weight, obtaining [(2S)-oxetan-2-yl]methanol (49.2 g, yield 90%).

Nuclear magnetic data of [(2S)-oxetan-2-yl]methanol is as follows:

$^1$H NMR (300 MHz, CDCl$_3$): δ 4.91 (1H, m), δ 4.68 (1H, m), δ 4.51 (1H, m), δ 3.70 (1H, m), δ 3.61 (1H, m), δ 3.08 (1H, m), δ 2.60 (2H, m).

(4) 1000.0 mL of dichloromethane, 100.0 g (1.13 mol, 1.00 equ.) of [(2S)-oxetan-2-yl]methanol, and 205.8 g (2.03 mol, 1.80 equ.) of triethylamine, and 258.5 g (1.36 mol, 1.20 equ.) of p-toluenesulfonyl chloride were added to a reaction flask and mixed to be uniform. The resulting mixture was subjected to an esterification reaction at 25° C. for 15 h. 500.0 mL of water was added thereto and stirred for 30 min. The resulting mixture was left to stand and layered. The obtained organic phase was subjected to a washing with 500.0 mL of 1 mol/L aqueous hydrochloric acid solution, a washing with 500.0 mL of saturated aqueous sodium bicarbonate solution, and a washing with 500.0 mL of water in sequence. The washed organic phase was dried with 20.0 g of anhydrous sodium sulfate and then filtered. The obtained filtrate was concentrated to 100.0 mL, and subjected to a recrystallization by using 300.0 mL of methyl tert-butyl ether, obtaining [(2S)-oxetan-2-yl]methyl p-toluenesulfonate (221.8 g, yield 81%).

Nuclear magnetic data of [(2S)-oxetan-2-yl]methyl p-toluenesulfonate is as follows:

$^1$H NMR (300 MHz, CDCl$_3$): δ 7.76 (2H, d, J=8.1 Hz), δ 7.30 (2H, d, J=8.1 Hz), δ 4.86 (1H, m), δ 4.52 (1H, m), δ 4.43 (1H, m), δ 4.10 (2H, m), δ 2.64 (1H, m), δ 2.49 (1H, m), δ 2.39 (3H, s).

(5) 700.0 mL of N,N-dimethylformamide, 100.0 g (0.41 mol, 1.00 equ.) of [(2S)-oxetanyl-2-yl]methyl p-toluenesulfonate, and 76.4 g (0.41 mol, 1.00 equ.) of potassium phthalimide were added to a reaction flask and mixed to be uniform. The resulting mixture was heated to 115° C. and subjected to a first substitution reaction for 3 h. The reaction liquid was cooled to room temperature. 700.0 mL of water and 500.0 mL of ethyl acetate was added thereto, and the resulting mixture was stirred for 30 min, left to stand, and layered, obtaining an organic phase and an aqueous phase. The aqueous phase was subjected to an extraction twice with 250.0 mL of ethyl acetate. The obtained organic phases were combined, washed with 500.0 mL of saturated aqueous sodium chloride solution, dried with 20.0 g of anhydrous sodium sulfate, and filtered. The obtained filtrate was concentrated to 200.0 mL, and subjected to a recrystallization by adding 500.0 mL of petroleum ether dropwise, obtaining (2S)-(oxetan-2-yl)methyl-isoindole-1,3-dione (62.3 g, yield 70%).

Nuclear magnetic data of (2S)-(oxetan-2-yl)methyl-isoindole-1,3-dione is as follows:

$^1$H NMR (300 MHz, CDCl$_3$): δ 7.86 (2H, m), δ 7.73 (2H, m), δ 5.07 (1H, m), δ 4.64 (2H, m), δ 4.04 (1H, dd, J=6.3 Hz, 14.1 Hz), δ 3.92 (1H, dd, J=5.4 Hz, 14.1 Hz), δ 2.73 (1H, m), δ 2.54 (1H, m).

(6) 500.0 mL of water and 100.0 g (0.46 mol, 1.00 equ.) of (2S)-(oxetan-2-yl)methyl-isoindole-1,3-dione were added to a reaction flask, and mixed to be uniform. 45.0 g (0.72 mol, 1.50 equ.) of an aqueous hydrazine hydrate solution (with a concentration of 80 wt %) was added thereto dropwise. The resulting mixture was subjected to a second substitution reaction at 45° C. for 35 h. The reaction liquid was cooled to 5° C. and then filtered. A pH value of the obtained filtrate was adjusted to 4 by using an aqueous hydrochloric acid solution (with a concentration of 35 wt. %). The adjusted filtrate was subjected to an extraction with 200.0 mL of dichloromethane. A pH value of the obtained aqueous phase was adjusted to 14 by using an aqueous sodium hydroxide solution (with a concentration of 4 mol/L), and the adjusted aqueous phase was subjected to an extraction with 200.0 mL of dichloromethane for 5 times. The organic phases were combined and dried with 30.0 g of anhydrous sodium sulfate, and filtered. The obtained filtrate was concentrated to 200 mL, and then distilled at 40° C. for 5 h, obtaining (S)-oxetan-2-ylmethanamine (28.0 g, yield 70%).

Nuclear magnetic data of (S)-oxetan-2-ylmethanamine is as follows:

$^1$H NMR (300 MHz, CDCl$_3$): δ 4.78 (1H, m), δ 4.66 (1H, m), δ 4.47 (1H, m), δ 2.86 (2H, d, J=5.1 Hz), δ 2.59 (1H, m), δ 2.43 (1H, m), δ 1.62 (2H, brs).

MS (ESI$^+$, m/z)=88.2.

Example 2

Scale-Up Production (1) 10.0 kg (134.99 mol, 1.00 equ.) of (R)-(+)-glycidol, and 19.5 kg (269.98 mol, 2.00 equ.) of ethyl vinyl ether were added to a reaction flask, and cooled to 5° C. 256.8 g (1.35 mol, 0.01 equ.) of p-toluenesulfonic acid hydrate was added thereto in batches. The resulting mixture was subjected to an addition reaction at 25° C. for 4 h. 27.0 kg of saturated aqueous sodium bicarbonate solution was added thereto. The resulting mixture was stirred for 1 h, left to stand, and layered. The obtained organic phase was dried with 2.0 kg of anhydrous sodium sulfate and then filtered. The obtained filtrate was concentrated to a constant weight, obtaining (2S)-2-[(1-ethoxyethoxy)methyl]oxirane (18.0 kg, yield 91%).

Nuclear magnetic data of (2S)-2-[(1-ethoxyethoxy)methyl]oxirane is as follows:

$^1$H NMR (300 MHz, CDCl$_3$): δ 4.70 (1H, m), δ 3.60 (2H, m), δ 3.40 (2H, m), δ 3.08 (1H, m), δ 2.74 (1H, t, J=4.8 Hz), δ 2.56 (1H, dd, J=2.4, 5.1 Hz), δ 1.26 (3H, d, J=2.4, 5.1 Hz), 1.15 (3H, t, J=7.2 Hz).

(2) 18.0 kg (123.14 mol, 1.00 equ.) of (2S)-2-[(1-ethoxyethoxy)methyl]oxirane was dissolved in 18 L of tert-butanol, obtaining a (2S)-2-[(1-ethoxyethoxy)methyl]oxirane solution. 342.0 L of tert-butanol, 27.6 kg (246.28 mol, 2.00 equ.) of potassium tert-butoxide, 54.2 kg (246.28 mol, 2.00 equ.) of trimethylsulfoxonium iodide were added to a reaction flask, and they were heated to 65° C. and stirred for 1 h. The (2S)-2-[(1-ethoxyethoxy)methyl]oxirane solution was added thereto dropwise at 65° C., and the resulting mixture was subjected to a ring expansion reaction at 65° C. for 15 h. The reaction liquid was filtered, and the obtained filtrate was concentrated to 20 L. 45.0 L of water was added thereto, and the resulting mixture was subjected to an extraction with 18.0 L of methyl tert-butyl ether. The obtained organic phase was washed with 27.0 L of saturated aqueous sodium chloride solution, then dried with 3.6 kg of anhydrous sodium sulfate, and filtered. The obtained filtrate was concentrated to a constant weight, obtaining (2S)-[2-(1-ethoxyethoxy)methyl]propylene oxide (17.8 kg, yield 90%).

Nuclear magnetic data of (2S)-[2-(1-ethoxyethoxy)methyl]propylene oxide is as follows:

$^1$H NMR (300 MHz, CDCl$_3$): δ 5.00 (1H, m), δ 4.86 (1H, m), δ 4.72 (1H, m), δ 4.62 (1H, m), δ 3.74 (3H, m), δ 3.56 (1H, m), δ 1.40 (3H, m), δ 1.26 (1H, t, J=7.2 Hz).

(3) 45.9 L of water, 5.3 kg (88.07 mol, 0.83 equ.) of acetic acid, and 17.0 kg (106.11 mol, 1.00 equ.) of (2S)-[2-(1-ethoxyethoxy)methyl]propylene oxide were added to a reaction flask, and the resulting mixture was subjected to an acid-catalyzed hydrolysis reaction at 25° C. for 15 h. 7.6 kg of sodium bicarbonate was added thereto in 5 times to adjust the pH value to 7, and 25.5 kg of potassium carbonate was then added thereto to adjust the pH value to 12. The resulting mixture was subjected to an extraction with dichloromethane. The obtained organic phase was dried with 3.4 kg of anhydrous sodium sulfate and then filtered. The obtained filtrate was concentrated to a constant weight, obtaining [(2S)-oxetan-2-yl]methanol (8.3 kg, yield 89%).

Nuclear magnetic data of [(2S)-oxetan-2-yl]methanol is as follows:

$^1$H NMR (300 MHz, CDCl$_3$): δ 4.91 (1H, m), δ 4.68 (1H, m), δ 4.51 (1H, m), δ 3.70 (1H, m), δ 3.61 (1H, m), δ 3.08 (1H, m), δ 2.60 (2H, m).

(4) 80.0 L of dichloromethane, 8.0 kg (90.80 mol, 1.00 equ) of [(2S)-oxetanyl-2-yl]methanol, 16.5 kg (163.44 mol, 1.80 equ.) of triethylamine, and 20.8 kg (108.96 mol, 1.20 equ.) of p-toluenesulfonyl chloride were added to a reaction flask, and mixed to be uniform. The resulting mixture was subjected to an esterification reaction at 25° C. for 15 h. 40.0 L of water was added thereto and stirred for 30 min. The resulting mixture was left to stand and layered. The obtained organic phase was subjected to a washing with 40.0 L of 1 mol/L aqueous hydrochloric acid solution, a washing with 40.0 L of saturated aqueous sodium bicarbonate solution, and a washing with 40.0 L of water in sequence. The obtained organic phase was dried with 3.2 kg of anhydrous sodium sulfate and then filtered. The obtained filtrate was concentrated to 10.0 L, and subjected to a recrystallization by using 24.0 L of methyl tert-butyl ether, obtaining [(2S)-oxetan-2-yl]methyl p-toluenesulfonate (18.0 kg, yield 82%).

Nuclear magnetic data of [(2S)-oxetan-2-yl]methyl p-toluenesulfonate is as follows:

$^1$H NMR (300 MHz, CDCl$_3$): δ 7.76 (2H, d, J=8.1 Hz), δ 7.30 (2H, d, J=8.1 Hz), δ 4.86 (1H, m), δ 4.52 (1H, m), δ 4.43 (1H, m), δ 4.10 (2H, m), δ 2.64 (1H, m), δ 2.49 (1H, m), δ 2.39 (3H, s).

(5) 126.0 L of N,N-dimethylformamide, 18.0 kg (74.38 mol, 1.00 equ.) of [(2S)-oxetan-2-yl]methyl p-toluenesulfonate, and 13.8 kg (74.38 mol, 1.00 equ.) of potassium phthalimide were added to a reaction flask, and mixed to be uniform. The resulting mixture was heated to 115° C. and subjected to a first substitution reaction for 3 h. The reaction liquid was cooled to room temperature. 126.0 L of water and 90.0 L of ethyl acetate were added thereto, and the resulting mixture was stirred for 30 min, left to stand, and layered, obtaining an organic phase and an aqueous phase. The obtained aqueous phase was subjected to an extraction twice with 45.0 L of ethyl acetate. The obtained organic phases were combined, washed with 90.0 L of saturated aqueous sodium chloride solution, dried with 3.6 kg of anhydrous sodium sulfate, and filtered. The obtained filtrate was concentrated to 40.0 L, and subjected to a recrystallization by adding 90.0 L of petroleum ether dropwise, obtaining (2S)-(oxetan-2-yl)methyl-isoindole-1,3-dione (10.8 kg, yield 67%).

Nuclear magnetic data of (2S)-(oxetan-2-yl)methyl-isoindole-1,3-dione is as follows:

$^1$H NMR (300 MHz, CDCl$_3$): δ 7.86 (2H, m), δ 7.73 (2H, m), δ 5.07 (1H, m), δ 4.64 (2H, m), δ 4.04 (1H, dd, J=6.3 Hz, 14.1 Hz), δ 3.92 (1H, dd, J=5.4 Hz, 14.1 Hz), δ 2.73 (1H, m), δ 2.54 (1H, m).

(6) 50.0 L of water, and 10.0 kg (46.08 mol, 1.00 equ) of (2S)-(oxetan-2-yl)methyl-isoindole-1,3-dione were added to a reaction flask, and mixed to be uniform, 4.5 kg (69.12 mol, 1.50 equ.) of an aqueous hydrazine hydrate solution (with a concentration 80 wt %) was added thereto dropwise. The resulting mixture was subjected to a second substitution reaction at 45° C. for 35 h. The reaction liquid was cooled to 5° C. and then filtrated. A pH value of the obtained filtrate was adjusted to 4 by using an aqueous hydrochloric acid solution (with a concentration of 35 wt. %). The adjusted filtrate was subjected to an extraction with 20.0 L of dichloromethane. A pH value of the obtained aqueous phase was adjusted to 14 by using an aqueous sodium hydroxide solution (with a concentration of 4 mol/L), and the adjusted aqueous phase was subjected to an extraction with 20.0 L of dichloromethane for 6 times. The organic phases were combined and dried with 3.0 kg anhydrous sodium sulfate, and filtered. The obtained filtrate was concentrated to 20 L, and then distill at 40° C. for 15 h, obtaining (S)-oxetan-2-ylmethanamine (3.0 kg, yield 75%).

Nuclear magnetic data of (S)-oxetan-2-ylmethanamine is as follows:

$^1$H NMR (300 MHz, CDCl$_3$): δ 4.78 (1H, m), δ 4.66 (1H, m), δ 4.47 (1H, m), δ 2.86 (2H, d, J=5.1 Hz), δ 2.59 (1H, m), δ 2.43 (1H, m), δ 1.62 (2H, brs).

MS (ESI$^+$, m/z)=88.2.

Example 3

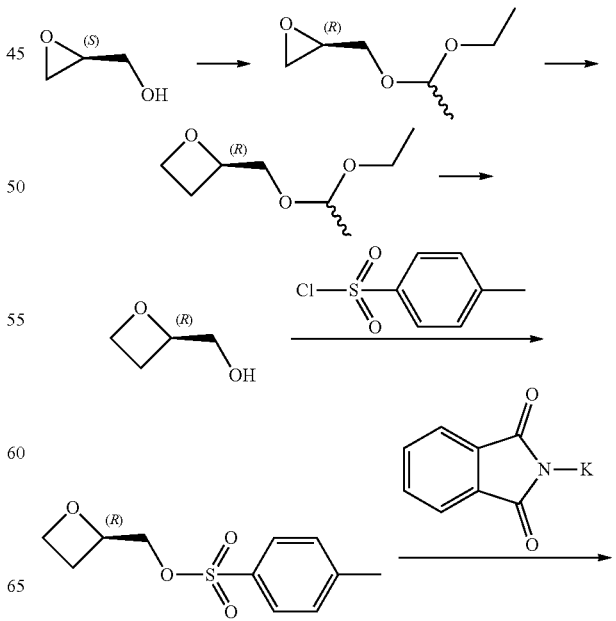

-continued

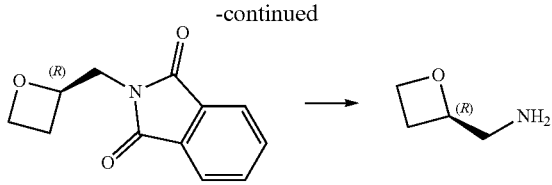

Preparation in Laboratory (1) 60.0 g (0.68 mol, 1.00 equ.) of (S)-(−)-glycidol and 98.1 g (1.36 mol, 2.00 equ.) of ethyl vinyl ether were added to a reaction flask, and cooled to 5° C. 1.29 g (0.0068 mol, 0.01 equ.) of p-toluenesulfonic acid hydrate was added thereto in 3 times. The resulting mixture was subjected to an addition reaction at 25° C. for 4 h. 162.0 g of saturated aqueous sodium bicarbonate solution was added thereto. The resulting mixture was stirred for 1 h, left to stand, and layered. The obtained organic phase was dried with 12.0 g of anhydrous sodium sulfate and then filtered. The obtained filtrate was concentrated to a constant weight, obtaining (2R)-2-[(1-ethoxyethoxy)methyl]oxirane (84.5 g, yield 85%).

Nuclear magnetic data of (2R)-2-[(1-ethoxyethoxy)methyl]oxirane is as follows:

$^1$H NMR (300 MHz, CDCl$_3$): δ 4.77 (1H, m), δ 3.73 (2H, m), δ 3.51 (2H, m), δ 3.16 (1H, m), δ 2.81 (1H, t, J=4.8 Hz), δ 2.65 (1H, dd, J=2.4, 5.1 Hz), δ 1.29 (3H, d, J=2.4, 5.1 Hz), 1.21 (3H, t, J=7.2 Hz).

(2) 50.0 g (0.34 mol. 1.00 equ) of (2R)-2-[(1-ethoxyethoxy)methyl]oxirane was dissolved in 50.0 mL of tert-butanol, obtaining a (2R)-2-[(1-ethoxyethoxy)methyl]oxirane solution. 950.0 mL of tert-butanol, 76.8 g (0.68 mol, 2.00 equ.) of potassium tert-butoxide, and 150.8 g (0.68 mol, 2.00 equ.) of trimethylsulfoxonium iodide were added to a reaction flask, and they were heated to 65° C. and stirred for 1 h. The (2R)-2-[(1-ethoxyethoxy)methyl]oxirane solution was added thereto dropwise at 65° C., and the resulting mixture was subjected to a ring expansion reaction at 65° C. for 15 h. The reaction liquid was filtered, and the obtained filtrate was concentrated to 50 mL. 125.0 mL of water was added thereto, and the resulting mixture was subjected to an extraction with 100.0 mL of methyl tert-butyl ether. The obtained organic phase was washed with 75.0 mL of saturated aqueous sodium chloride solution, then dried with 10.0 g of anhydrous sodium sulfate, and filtered. The obtained filtrate was concentrated to a constant weight, obtaining (2R)-[2-(1-ethoxyethoxy)methyl]propylene oxide (50.6 g, yield 93%).

Nuclear magnetic data of (2R)-[2-(1-ethoxyethoxy)methyl]propylene oxide is as follows:

$^1$H NMR (300 MHz, CDCl$_3$): δ 4.93 (1H, m), δ 4.80 (1H, m), δ 4.65 (1H, m), δ 4.56 (1H, m), δ 3.67 (3H, m), δ 3.49 (1H, m), δ 1.35 (3H, m), δ 1.21 (1H, t, J=7.2 Hz).

(3) 135.0 ml of water, 15.6 g (0.26 mol, 0.83 equ.) of acetic acid, and 50.0 g (0.31 mol, 1.00 equ.) of (2R)-[2-(1-ethoxyethoxy)methyl]propylene oxide were added to a reaction flask, and the resulting mixture was subjected to an acid-catalyzed hydrolysis reaction at 25° C. for 15 h. 22.5 g of sodium bicarbonate was added thereto in 3 times to adjust the pH value to 7, and 75.0 g of potassium carbonate was then added thereto to adjust the pH value to 12. The resulting mixture was subjected to an extraction with dichloromethane. The obtained organic phase was dried with 10.0 g of anhydrous sodium sulfate and then filtered. The obtained filtrate was concentrated to a constant weight, obtaining [(2R)-oxetan-2-yl]methanol (24.7 g, yield 90%).

Nuclear magnetic data of [(2R)-oxetan-2-yl]methanol is as follows:

$^1$H NMR (300 MHz, CDCl$_3$): δ 4.96 (1H, m), δ 4.71 (1H, m), δ 4.50 (1H, m), δ 3.73 (1H, m), δ 3.65 (1H, m), δ 3.10 (1H, m), δ 2.65 (2H, m).

(4) 500.0 mL of dichloromethane, 50.0 g (0.56 mol. 1.00 equ) of [(2R)-oxetanyl-2-yl]methanol, 102.9 g (1.02 mol, 1.80 equ.) of triethylamine, and 129.2 g (0.68 mol, 1.20 equ.) of p-toluenesulfonyl chloride were added to a reaction flask, and mixed to be uniform. The resulting mixture was subjected to an esterification reaction at 25° C. for 15 h. 250.0 mL of water was added thereto and stirred for 30 min. The resulting mixture was left to stand and layered. The obtained organic phase was subjected to a washing with 250.0 mL of 1 mol/L aqueous hydrochloric acid solution, a washing with 250.0 mL of saturated aqueous sodium bicarbonate solution, and a washing with 250.0 mL of water in sequence. The obtained organic phase was dried with 10.0 g of anhydrous sodium sulfate and then filtered. The obtained filtrate was concentrated to 50.0 mL, and subjected to a recrystallization by using 150.0 mL of methyl tert-butyl ether, obtaining [(2R)-oxetan-2-yl]methyl p-toluenesulfonate (113.8 g, yield 84%).

Nuclear magnetic data of [(2R)-oxetan-2-yl]methyl p-toluenesulfonate is as follows:

$^1$H NMR (300 MHz, CDCl$_3$): δ 7.83 (2H, d, J=8.1 Hz), δ 7.36 (2H, d, J=8.1 Hz), δ 4.93 (1H, m), δ 4.60 (1H, m), δ 4.49 (1H, m), δ 4.16 (2H, m), δ 2.73 (1H, m), δ 2.57 (1H, m), δ 2.39 (3H, s).

(5) 350.0 mL of N,N-dimethylformamide, 50.0 g (0.20 mol, 1.00 equ.) of [(2R)-oxetan-2-yl]methyl p-toluenesulfonate, and 38.2 g (0.20 mol, 1.00 equ.) of potassium phthalimide were added to a reaction flask and mixed to be uniform. The resulting mixture was heated to 115° C. and subjected to a first substitution reaction for 3 h. The reaction liquid was cooled to room temperature. 350.0 mL of water and 250.0 mL of ethyl acetate were added thereto, and the resulting mixture was stirred for 30 min, left to stand, and layered, obtaining an organic phase and an aqueous phase. The obtained aqueous phase was subjected to an extraction twice with 125.0 mL of ethyl acetate. The obtained organic phases were combined, washed with 250.0 mL of saturated aqueous sodium chloride solution, dried with 10.0 g of anhydrous sodium sulfate, and filtered. The obtained filtrate was concentrated to 100.0 mL, and subjected to a recrystallization by adding 5250.0 mL of petroleum ether dropwise, obtaining (2R)-(oxetan-2-yl)methyl-isoindole-1,3-dione (31.7 g, yield 73%).

Nuclear magnetic data of (2R)-(oxetan-2-yl)methyl-isoindole-1,3-dione is as follows:

$^1$H NMR (300 MHz, CDCl$_3$): δ 7.86 (2H, m), δ 7.73 (2H, m), δ 5.07 (1H, m), δ 4.61 (2H, m), δ 4.07 (1H, dd, J=6.3 Hz, 14.1 Hz), δ 3.91 (1H, dd, J=5.4 Hz, 14.1 Hz), δ 2.70 (1H, m), δ 2.57 (1H, m).

(6) 250.0 mL of water and 50.0 g (0.23 mol, 1.00 equ.) of (2R)-(oxetan-2-yl)methyl-isoindole-1,3-dione were added to a reaction flask, and mixed to be uniform. 22.5 g (0.36 mol, 1.50 equ.) of an aqueous hydrazine hydrate solution (with a concentration 80 wt %) was added thereto dropwise. The resulting mixture was subjected to a second substitution reaction at 45° C. for 35 h. The reaction liquid was cooled to 5° C. and filtrated. A pH value of the obtained filtrate was adjusted to 4 by using an aqueous hydrochloric acid solution (with a concentration of 35 wt. %). The adjusted filtrate was subjected to an extraction with 100.0 mL of dichloromethane. A pH value of the obtained aqueous phase was adjusted to 14 by using an aqueous sodium hydroxide solution (with a concentration of 4 mol/L), and the adjusted aqueous phase was subjected to an extraction with 100.0 mL of dichloromethane for 5 times. The organic phases were combined and dried with 15.0 g of anhydrous sodium sulfate, and filtered. The obtained filtrate was concentrated to 100 mL, and then distilled at 40° C. for 5 h, obtaining (R)-oxetan-2-ylmethanamine (14.8 g, yield 74%).

Nuclear magnetic data of (R)-oxetan-2-ylmethanamine is as follows:

$^1$H NMR (300 MHz, CDCl$_3$): δ 4.61 (1H, m), δ 4.49 (1H, m), δ 4.36 (1H, m), δ 2.67 (2H, d, J=5.1 Hz), δ 2.51 (1H, m), δ 2.41 (1H, m), δ 1.62 (2H, brs).

MS (ESI$^+$, m/z)=88.2.

Example 4

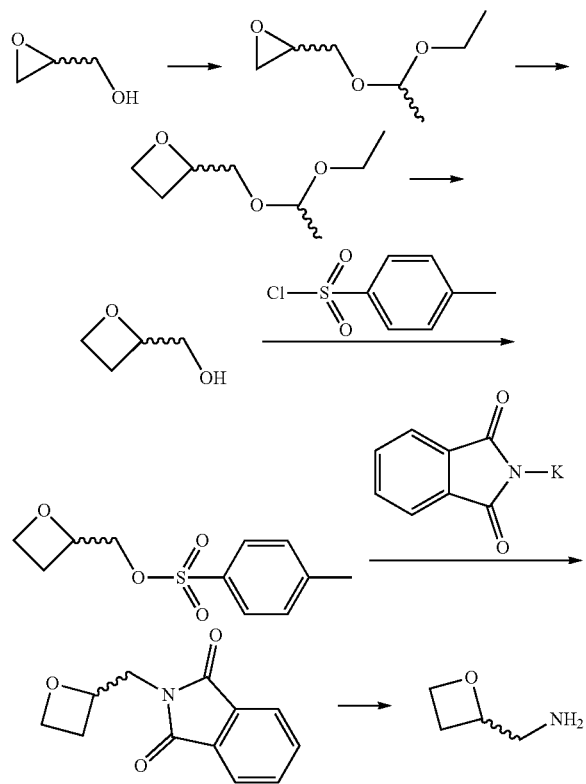

Preparation in Laboratory (1) 60.0 g (0.68 mol, 1.00 equ.) of glycidol and 98.1 g (1.36 mol, 2.00 equ.) of ethyl vinyl ether were added to a reaction flask, and they were cooled to 5° C. 1.3 g (0.0068 mol, 0.01 equ.) of p-toluenesulfonic acid hydrate was added thereto in 3 times. The resulting mixture was subjected to an addition reaction at 25° C. for 4 h. 162.0 g of saturated aqueous sodium bicarbonate solution was added thereto. The resulting mixture was stirred for 1 h, left to stand, and layered. The obtained organic phase was dried with 12.0 g of anhydrous sodium sulfate and then filtered. The obtained filtrate was concentrated to a constant weight, obtaining [2-(1-ethoxyethoxy)methyl]oxirane (82.5 g, yield 83%).

Nuclear magnetic data of [2-(1-ethoxyethoxy)methyl]oxirane is as follows:

$^1$H NMR (300 MHz, CDCl$_3$): δ 4.70-4.77 (1H, m), δ 3.60-3.73 (2H, m), δ 3.40-3.51 (2H, m), δ 3.09-3.16 (1H, m), δ 2.74-2.81 (1H, t, J=4.8 Hz), δ 2.56-2.65 (1H, dd, J=2.4, 5.1 Hz), δ 1.26-1.29 (3H, d, J=2.4, 5.1 Hz), 1.15-1.21 (3H, t, J=7.2 Hz).

(2) 50.0 g (0.34 mol, 1.00 equ.) of [2-(1-ethoxyethoxy)methyl]oxirane was dissolved in 50.0 mL of tert-butanol, obtaining a [2-(1-ethoxyethoxy)methyl]oxirane solution. 950.0 mL of tert-butanol, 76.8 g (0.68 mol, 2.00 equ.) of potassium tert-butoxide, and 150.8 g (0.68 mol, 2.00 equ.) of trimethylsulfoxonium iodide were added to a reaction flask, and they were heated to 65° C. and stirred for 1 h. The [2-(1-ethoxyethoxy)methyl]oxirane solution was added thereto dropwise at 65° C., and the resulting mixture was subjected to a ring expansion reaction at 65° C. for 15 h. The reaction liquid was filtered, and the obtained filtrate was concentrated to 50.0 mL. 125.0 mL of water was added thereto, and the resulting mixture was subjected to an extraction with 100.0 mL of methyl tert-butyl ether. The obtained organic phase was washed with 75.0 mL of saturated aqueous sodium chloride solution, dried with 10.0 g of anhydrous sodium sulfate, and filtered. The obtained filtrate was concentrated to a constant weight, obtaining [2-(1-ethoxyethoxy)methyl]propylene oxide (51.2 g, yield 94%).

Nuclear magnetic data of [2-(1-ethoxyethoxy)methyl] propylene oxide is as follows:

$^1$H NMR (300 MHz, CDCl$_3$): δ 4.93-5.00 (1H, m), δ 4.80-4.86 (1H, m), δ 4.65-4.72 (1H, m), δ 4.56-4.62 (1H, m), δ 3.67-3.74 (3H, m), δ 3.49-3.56 (1H, m), δ 1.35-1.40 (3H, m), δ 1.21-1.26 (1H, t, J=7.2 Hz).

(3) 135.0 ml of water, 15.6 g (0.26 mol, 0.83 equ.) of acetic acid, and 50.0 g (0.31 mol, 1.00 equ.) of [2-(1-ethoxyethoxy)methyl]propylene oxide were added to a reaction flask, and the resulting mixture was subjected to an acid-catalyzed hydrolysis reaction at 25° C. for 15 h. 22.5 g of sodium bicarbonate was added thereto in 3 times to adjust the pH value to 7, and 75.0 g of potassium carbonate was added thereto to adjust the pH value to 12. The resulting mixture was subjected to an extraction with dichloromethane. The obtained organic phase was dried with 10.0 g of anhydrous sodium sulfate and then filtered. The obtained filtrate was concentrated to a constant weight, obtaining (oxetan-2-yl)methanol (25.7 g, yield 94%).

Nuclear magnetic data of (oxetan-2-yl)methanol is as follows:

$^1$H NMR (300 MHz, CDCl$_3$): δ 4.91-4.96 (1H, m), δ 4.68-4.71 (1H, m), δ 4.50-4.51 (1H, m), δ 3.70-3.73 (1H, m), δ 3.61-3.65 (1H, m), δ 3.08-3.10 (1H, m), δ 2.60-2.65 (2H, m).

(4) 500.0 mL of dichloromethane, 50.0 g (0.56 mol, 1.00 equ.) of (oxetanyl-2-yl)methanol, 102.9 g (1.02 mol, 1.80 equ.) of triethylamine, and 129.2 g (0.68 mol, 1.20 equ.) of p-toluenesulfonyl chloride were added to a reaction flask and mixed to be uniform. The resulting mixture was subjected to an esterification reaction at 25° C. for 15 h. 250.0 mL of water was added thereto and stirred for 30 min. The resulting mixture was left to stand and layered. The obtained organic phase was subjected to a washing with 250.0 mL of 1 mol/L aqueous hydrochloric acid solution, a washing with 250.0 mL of saturated aqueous sodium bicarbonate solution, and a washing with 250.0 mL of water in sequence. The obtained organic phase was dried with 10.0 g of anhydrous sodium sulfate and then filtered. The obtained filtrate was concentrated to 50.0 mL, and subjected to a recrystallization by using 150.0 mL of methyl tert-butyl ether, obtaining (oxetan-2-yl)methyl p-toluenesulfonate (115.3 g, yield 85%).

Nuclear magnetic data of (oxetan-2-yl)methyl p-toluenesulfonate is as follows:

¹H NMR (300 MHz, CDCl₃): δ 7.76-7.83 (2H, d, J=8.1 Hz), δ 7.30-7.36 (2H, d, J=8.1 Hz), δ 4.86-4.93 (1H, m), δ 4.52-4.60 (1H, m), δ 4.43-4.49 (1H, m), δ 4.10-4.16 (2H, m), δ 2.64-2.73 (1H, m), δ 2.49-2.57 (1H, m), δ 2.39 (3H, s).

(5) 350.0 mL of N,N-dimethylformamide, 50.0 g (0.20 mol, 1.00 equ.) of (oxetan-2-yl)methyl p-toluenesulfonate, and 38.2 g (0.20 mol, 1.00 equ.) of potassium phthalimide were added to a reaction flask and mixed to be uniform. The resulting mixture was heated to 115° C. and subjected to a first substitution reaction for 3 h. The reaction liquid was cooled to room temperature. 350.0 mL of water and 250.0 mL of ethyl acetate was added thereto, and the resulting mixture stirred for 30 min, left to stand, and layered, obtaining an organic phase and an aqueous phase. The aqueous phase was subjected to an extraction twice with 125.0 mL of ethyl acetate. The obtained organic phases were combined, washed with 250.0 mL of saturated aqueous sodium chloride solution, dried with 10.0 g of anhydrous sodium sulfate, and filtered. The obtained filtrate was concentrated to 100.0 mL, and subjected to a recrystallization by adding 5250.0 mL of petroleum ether dropwise, obtaining (oxetan-2-yl)methyl-isoindole-1,3-dione (32.6 g, yield 75%).

Nuclear magnetic data of (oxetan-2-yl)methyl-isoindole-1,3-dione is as follows:

¹H NMR (300 MHz, CDCl₃): δ 7.86 (2H, m), δ 7.73 (2H, m), δ 5.07 (1H, m), δ 4.61-4.64 (2H, m), δ 4.04-4.07 (1H, dd, J=6.3 Hz, 14.1 Hz), δ 3.91-3.92 (1H, dd, J=5.4 Hz, 14.1 Hz), δ 2.70-2.73 (1H, m), δ 2.54-2.57 (1H, m).

(6) 250.0 mL of water and 50.0 g (0.23 mol, 1.00 equ.) of (oxetan-2-yl)methyl-isoindole-1,3-dione were added to a reaction flask, and mixed to be uniform. 22.5 g (0.36 mol, 1.50 equ.) of an aqueous hydrated hydrazine solution (with a concentration of 80 wt. %) was added thereto dropwise. The resulting mixture was subjected to a second substitution reaction at 45° C. for 35 h. The reaction liquid was cooled to 5° C. and then filtrated. A pH value of the obtained filtrate was adjusted to 4 by using an aqueous hydrochloric acid solution (with a concentration of 35 wt. %). The adjusted filtrate was subjected to an extraction with 100.0 mL of dichloromethane. A pH value of the obtained aqueous phase was adjusted to 14 by using an aqueous sodium hydroxide solution (with a concentration of 4 mol/L), and the adjusted aqueous phase was subjected to an extraction with 100.0 mL of dichloromethane for 5 times. The organic phases were combined and dried with 15.0 g of anhydrous sodium sulfate, and filtered. The obtained filtrate was concentrated to 100 mL, and then distilled at 40° C. for 5 h, obtaining oxetan-2-ylmethanamine (15.2 g, yield 76%).

Nuclear magnetic data of oxetan-2-ylmethanamine is as follows:

¹H NMR (300 MHz, CDCl₃): δ 4.61-4.78 (1H, m), δ 4.49-4.66 (1H, m), δ 4.36-4.47 (1H, m), δ 2.67-2.86 (2H, d, J=5.1 Hz), δ 2.51-2.59 (1H, m), δ 2.41-2.43 (1H, m), δ 1.62 (2H, brs).

MS (ESI⁺, m/z)=88.2.

The description of the above embodiments is only to help understand the method and core idea of the present disclosure. It should be pointed out that for those of ordinary skill in the art, without departing from the principle of the present disclosure, several improvements and modifications could be made to the present disclosure, and these improvements and modifications also fall within the scope of the claims of the present disclosure. Various modifications to these embodiments are obvious to those skilled in the art, and the general principles defined herein could be implemented in other embodiments without departing from the spirit or scope of the present disclosure. Therefore, the present disclosure will not be limited to the embodiments shown in this document, but should conform to the widest scope consistent with the principles and novel features disclosed in this document.

What is claimed is:

1. A method for preparing oxetan-2-ylmethanamine, the method comprising the steps of:
   (1) mixing [2-(1-ethoxyethoxy)methyl]propylene oxide with an acid solution, and subjecting a resulting solution to an acid-catalyzed hydrolysis reaction, to obtain (oxetan-2-yl)methanol, wherein the [2-(1-ethoxyethoxy)methyl]propylene oxide comprises at least one selected from the group consisting of (2S)-[2-(1-ethoxyethoxy)methyl]propylene oxide, (2R)-[2-(1-ethoxyethoxy)methyl]propylene oxide, and (2S,2R)-[2-(1-ethoxyethoxy)methyl]propylene oxide;
   (2) mixing the (oxetan-2-yl)methanol, a sulfonyl compound, triethylamine, and a chlorinated alkane solvent, and subjecting a resulting mixture to an esterification reaction, to obtain (oxetan-2-yl)methyl p-toluenesulfonate;
   (3) mixing the (oxetan-2-yl)methyl p-toluenesulfonate, a compound of phthalimide, and an amide solvent, and subjecting a resulting mixed solution to a first substitution reaction, to obtain (oxetan-2-yl)methyl-isoindole-1,3-dione; and
   (4) mixing the (oxetan-2-yl)methyl-isoindole-1,3-dione, an amino group-containing compound, and water, and subjecting a resulting mixed material to a second substitution reaction, to obtain the oxetan-2-ylmethanamine.

2. The method as claimed in claim 1, wherein in step (1), the acid solution comprises at least one selected from the group consisting of an acetic acid solution, a formic acid solution, a propionic acid solution, a butyric acid solution, a hydrochloric acid solution, and a sulfuric acid solution.

3. The method as claimed in claim 1, wherein in step (1), a molar ratio of the [2-(1-ethoxyethoxy)methyl]propylene oxide to an acid in the acid solution is in a range of 1:0.8 to 1:2.

4. The method as claimed in claim 3, wherein in step (1), a mass ratio of the [2-(1-ethoxyethoxy)methyl]propylene oxide to the acid in the acid solution is in a range of 17 kg:3-21 kg.

5. The method as claimed in claim 1, wherein in step (1), the acid-catalyzed hydrolysis reaction is performed at a temperature of 20-30° C. for 15-20 hours.

6. The method as claimed in claim 1, further comprising a post-treatment after the acid-catalyzed hydrolysis reaction in step (1), wherein the post-treatment comprises:
   adjusting a pH value of a reaction liquid obtained from the acid-catalyzed hydrolysis reaction to 11-12, and subjecting the reaction liquid to an extraction to obtain an organic phase, drying the organic phase, and concentrating to a constant weight.

7. The method as claimed in claim 1, wherein in step (2), a molar ratio of the (oxetan-2-yl)methanol, the sulfonyl compound, and triethylamine is in a range of 1:1.2-2:1.8-2.5.

8. The method as claimed in claim 1, wherein in step (2), the esterification reaction is performed at a temperature of 20-30° C. for 15-20 hours.

9. The method as claimed in claim 8, further comprising a post-treatment after the esterification reaction in step (2), wherein the post-treatment comprises:

adding water to a reaction liquid obtained from the esterification reaction, and layering a resulting system to obtain an organic phase, and subjecting the organic phase to a washing with a hydrochloric acid solution, a washing with saturated aqueous sodium bicarbonate solution, and a washing with water in sequence; drying a washed organic phase and concentrating to obtain a concentrated product; and subjecting the concentrated product to a recrystallization.

10. The method as claimed in claim 1, wherein in step (3), a molar ratio of the (oxetan-2-yl)methyl p-toluenesulfonate to the compound of phthalimide is in a range of 1:1 to 1:1.5.

11. The method as claimed in claim 1, wherein in step (3), the first substitution reaction is performed at a temperature of 110-120° C. for 3-5 hours.

12. The method as claimed in claim 11, further comprising a post-treatment after the first substitution reaction in step (3), wherein the post-treatment comprises cooling a reaction liquid obtained from the first substitution reaction to room temperature, adding water and an organic solvent thereto, layering a resulting system, to obtain an aqueous phase and an organic phase; subjecting the aqueous phase to an organic extraction, and washing a resulting organic phase obtained from the organic extraction and the organic phase obtained from the layering with saturated aqueous sodium chloride solution, sequentially drying a washed organic phase, and concentrating to obtain a concentrated product; and subjecting the concentrated product to a recrystallization.

13. The method as claimed in claim 1, wherein in step (4), a molar ratio of the (oxetan-2-yl)methyl-isoindole-1,3-dione to the amino group-containing compound is in a range of 1:1.5 to 1:3.

14. The method as claimed in claim 1, wherein in step (4), the amino group-containing compound comprises at least one selected from the group consisting of hydrazine hydrate, methylamine, and ethylamine.

15. The method as claimed in claim 1, wherein in step (4), the second substitution reaction is performed at a temperature of 40-50° C. for 35-40 hours.

16. The method as claimed in claim 15, further comprising a post-treatment after the second substitution reaction in step (4), wherein the post-treatment comprises:

cooling a reaction liquid obtained from the second substitution reaction, and filtrating a cooled reaction liquid to obtain a filtrate; adjusting a pH value of the filtrate to 4-5, and subjecting the filtrate to a pre-extraction; adjusting a pH value of an aqueous phase obtained from the pre-extraction to 13-14, and subjecting the aqueous phase to an extraction to obtain an organic phase; subjecting organic phases obtained from the pre-extraction and the extraction to a drying, a concentrating, and a distilling in sequence.

17. The method as claimed in claim 3, wherein in step (1), the acid-catalyzed hydrolysis reaction is performed at a temperature of 20-30° C. for 15-20 hours.

18. The method as claimed in claim 7, wherein in step (2), the esterification reaction is performed at a temperature of 20-30° C. for 15-20 hours.

19. The method as claimed in claim 10, wherein in step (3), the first substitution reaction is performed at a temperature of 110-120° C. for 3-5 hours.

20. The method as claimed in claim 13, wherein in step (4), the second substitution reaction is performed at a temperature of 40-50° C. for 35-40 hours.

* * * * *